US009793999B2

(12) United States Patent
Yu et al.

(10) Patent No.: US 9,793,999 B2
(45) Date of Patent: Oct. 17, 2017

(54) SYSTEM AND METHOD FOR 400G SIGNAL GENERATION AND COHERENT DETECTION (71) Applicants: ZTE Corporation, Shenzhen (CN); ZTE (USA) INC., Austin, TX (US)

(72) Inventors: Jianjun Yu, Basking Ridge, NJ (US); Ze Dong, Morristown, NJ (US); Hung-Chang Chien, Bridgewater, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/423,342

(22) PCT Filed: Aug. 15, 2013

(86) PCT No.: PCT/US2013/055047
§ 371 (c)(1),
(2) Date: Feb. 23, 2015

(87) PCT Pub. No.: WO2014/031423
PCT Pub. Date: Feb. 27, 2014

(65) Prior Publication Data
US 2015/0229405 A1 Aug. 13, 2015

Related U.S. Application Data (60) Provisional application No. 61/693,071, filed on Aug. 24, 2012.

(51) Int. Cl.
*H04B 10/532* (2013.01)
*H04B 10/556* (2013.01)
(Continued)

(52) U.S. Cl.
CPC ....... *H04B 10/532* (2013.01); *H04B 10/5167* (2013.01); *H04B 10/556* (2013.01);
(Continued)

(58) Field of Classification Search
None
See application file for complete search history.

(56) References Cited

U.S. PATENT DOCUMENTS 7,248,849 B1 7/2007 Ariyavisitakul et al.
8,180,227 B2 5/2012 Liu et al.
(Continued)

FOREIGN PATENT DOCUMENTS

JP 2010217455 A 9/2010
JP 2011223563 A 11/2011
(Continued)

OTHER PUBLICATIONS

International Search Report for PCT/US2013/055047 mailed Nov. 22, 2013.
(Continued)

*Primary Examiner* — Darren E Wolf
(74) *Attorney, Agent, or Firm* — Drinker Biddle & Reath LLP (57) ABSTRACT A novel digital signal processing scheme (DSP) for quadrature duobinary (QDB) spectrum shaped polarization multiplexed quadrature phase shift keying (PM-QPSK) based on multi-modulus blind equalizations (MMBE) is proposed and demonstrated with both simulation and experimental results. The key algorithms for this novel digital signal processing scheme include the cascaded multi-modulus algorithm (CMMA) for blind polarization de-multiplexing, multi-modulus QPSK partitioning frequency offset estimation (FOE) and two stage carrier phase recovery (CPR) with maximum likelihood phase estimation. The final signal is detected by maximum-likelihood sequence detection (MLSD) for data BER measurement. The feasibility of the proposed digital signal processing scheme is demonstrated by the experiment of 112 Gb/s QDB spectrum shaped
(Continued)

PM-QPSK signal with a 25 GHz bandwidth waveshaper for Nyquist WDM channels.

26 Claims, 7 Drawing Sheets

(51) Int. Cl.
    *H04B 10/516*     (2013.01)
    *H04B 10/61*     (2013.01)
    *H04J 14/06*     (2006.01)
    *H04L 27/01*     (2006.01)

(52) U.S. Cl.
    CPC ........... *H04B 10/61* (2013.01); *H04B 10/614* (2013.01); *H04J 14/06* (2013.01); *H04L 27/01* (2013.01)

(56) References Cited

U.S. PATENT DOCUMENTS

| | | |
|---|---|---|
| 8,457,503 B2 | 6/2013 | Akiyama |
| 8,498,542 B2 | 7/2013 | Frankel et al. |
| 8,532,503 B2 | 9/2013 | Nakashima et al. |
| 2004/0208614 A1* | 10/2004 | Price .................... H04B 10/505 398/152 |
| 2011/0243561 A1 | 10/2011 | Li et al. |
| 2011/0268456 A1 | 11/2011 | Nakamoto |
| 2015/0023667 A1 | 1/2015 | Yu et al. |

FOREIGN PATENT DOCUMENTS

| | | |
|---|---|---|
| JP | 2011234325 A | 11/2011 |
| JP | 2012090096 A | 5/2012 |

OTHER PUBLICATIONS

Huang, Y-K., "Mixed Line-Rate Transmission (112-Gb/s, 450-Gb/s, and 1.15-Tb/s) Over 3560 km of Field-Installed Fiber With Filterless Coherent Receiver", Journal Of Lightwave Technology, (2012), vol. 30, No. 4, pp. 609-617.

Chang J. H., et al., "Filtering Tolerance of 108-Gb/s POIMux Quadrature Duobinary Signal on 25-GHz Grid", OMR4, 3 pages, 2011.

Japanese Office Action with English Translation for application No. 2015-528532, Jan. 17, 2017.

Li, J., et al., "Enhanced Digital Coherent Receiver for High Spectral-Efficiency Dual-Polarization Quadrature Duobinary Systems", ECOC, 3 pages, 2010.

\* cited by examiner

SYSTEM AND METHOD FOR 400G SIGNAL GENERATION AND COHERENT DETECTION

CROSS-REFERENCE TO RELATED APPLICATIONS

This application is a national stage application (under 35 U.S.C. §371) of PCT/US2013/055047, filed Aug. 15, 2013, which claims benefit of U.S. Application No. 61/693,071, filed Aug. 24, 2012, both of which are incorporated herein by reference in their entirety.

FIELD OF THE INVENTION

The field of the present invention is communication systems, and particularly, systems and method for 400G Signal generation and coherent detection.

Introduction

With 100G coherent transport technologies based on PM-QPSK being commercialized at a rapid pace, it is believed that 400G transport per channel is likely one of the potential successors for the next-step capacity expansion[1]. The technology options for 400G transmission are being intensively studied among industrial research communities, which can be realized by increasing the symbol rate, increasing the number of bonded channels, increasing the number of modulation levels, or their combinations[2-4]. The approach using singe-carrier PM-16 QAM at 56 Gbaud per wavelength is mainly limited by the insufficient bandwidth of a series of devices from end to end such as electrical multiplexers, optical modulators, and analog to digital converters[5]. Although methods with reduced or low bandwidth requirement like dual-carrier PM-16 QAM at 28 Gbaud or 5-carrier PM-32 QAM at 9 Gbaud have been presented with spectral efficiency (SE) up to 8 b/s/Hz, unfortunately, the demonstrated maximum transmission distance ranging from 800 to 1200 km can hardly be achieved without employing special ultra-large-area fibers (ULAF) and Raman amplification to deal with the reduced nonlinearity tolerance and higher OSNR requirement. On the other hand, packing a number of established PM-QPSK channels in the way of Nyquist wavelength division multiplexing (N-WDM) is considered as a practical beyond-100G solution. N-WDM technology relies on pulse shaping via spectral filtering to optimize the trade-off between the SE and the impairment induced by inter-channel interference (ICI) and inter-symbol interference (ISI), and the suggested ratio of channel spacing to symbol rate is around 1.1. [xxx] Further reducing that ratio to achieve a higher SE will require innovation on DSP algorithms at the receiver to suppress the undesired noise and linear crosstalk linear equalization process[6].

In this disclosure, a 400G generation and transmission solution based on quad-carrier PM-QPSK at the total channel line rate of 512 Gb/s are demonstrated. For the first time, the channel/carrier-spacing-to-symbol-rate ratio was down to only 0.78, yielding a net SE of 4 b/s/Hz. Two 400G signals with no guard band in between were delivered over a re-circulating loop comprising SMF-28 fiber spans, EDFAs, and a 100-GHz-wide wavelength selective switch (WSS) to emulate the bandwidth narrowing effect as a result of cascade inline ROADMs. The results show that, even for the channel at the passband edge of WSS, over 2400-km reach was achieved with a BER below the soft-decision pre-FEC limit of $2 \times 10^{-2}$.

SUMMARY OF THE INVENTION

Aspects of the present invention include systems and methods for generating and detecting signals in communication systems, in one aspect, a system and method for 400G signal generation and coherent detection.

In another particular aspect, a novel digital signal processing scheme (DSP) for quadrature duobinary (QDB) spectrum shaped polarization multiplexed quadrature phase shift keying (PM-QPSK) based on multi-modulus blind equalizations (MMBE) is demonstrated with both simulation and experimental results. The key algorithms for this novel digital signal processing scheme include the cascaded multi-modulus algorithm (CMMA) for blind polarization de-multiplexing, multi-modulus QPSK partitioning frequency offset estimation (FOE) and two stage carrier phase recovery (CPR) with maximum likelihood phase estimation. The final signal is detected by maximum-likelihood sequence detection (MLSD) for data BER measurement. The feasibility of the proposed digital signal processing scheme is demonstrated by the experiment of 112 Gb/s QDB spectrum shaped PM-QPSK signal with a 25 GHz bandwidth waveshaper for Nyquist WDM channels.

EXPERIMENTAL SETUP AND RESULTS

Figure 1:
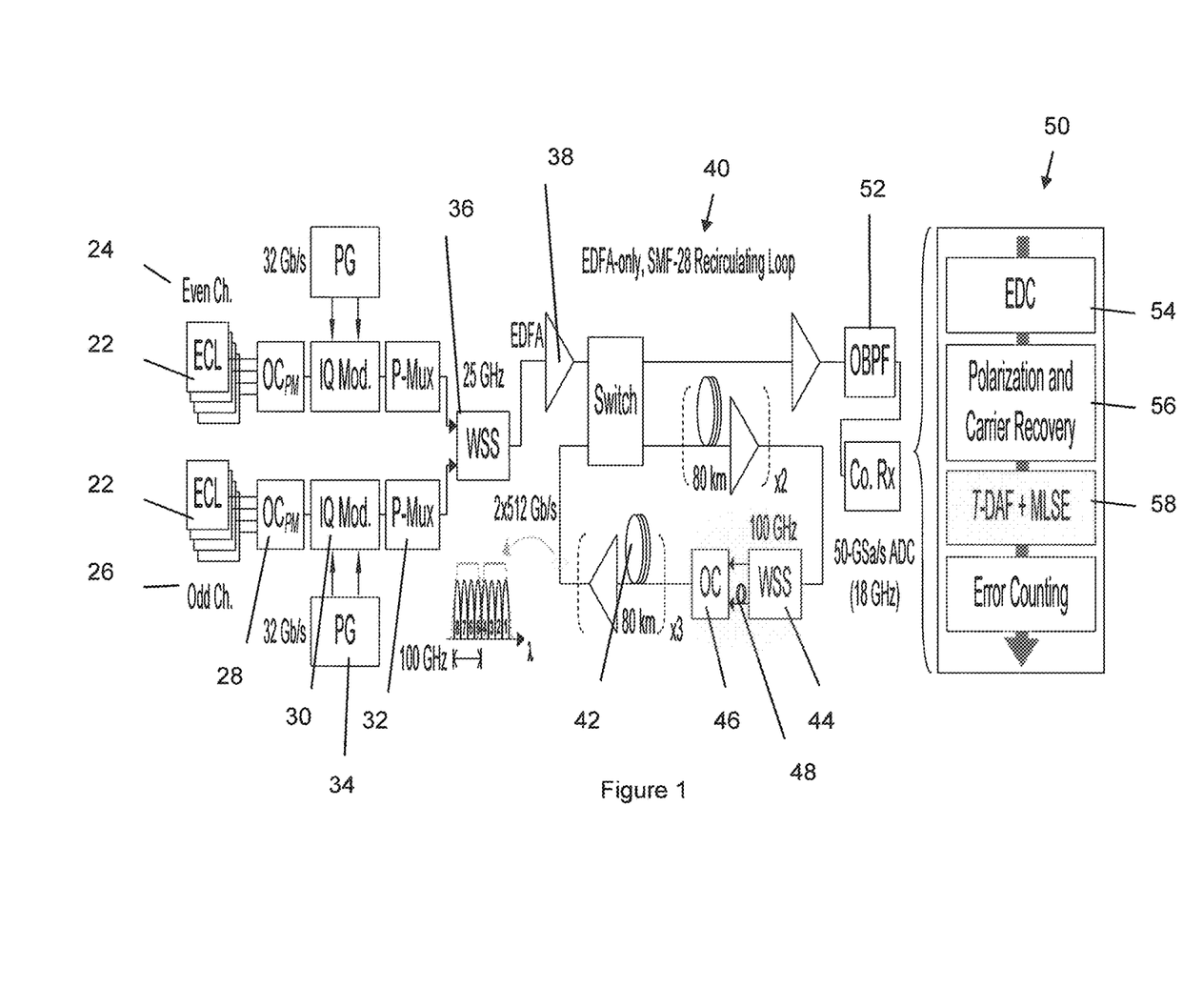
FIG. 1 illustrates the experiment setup for 400G transmission based on quad-carrier PM=QPSK with 4-b/s/Hz net SE.

FIG. 1 shows the experimental setup for 400G transmission based on quad-carrier PM-QPSK at 4 b/s/Hz, which contains 100 GHz inline WSS in re-circulating loop to study on the maximum transmission distance and also the highest number of ROADMs can be potentially achieved and passed. 8 external cavity lasers (ECLs) 22 are used as a CW light source array and grouped them into even channels 24 and odd channels 26 spaced at 25 GHz. Each of them has a linewidth less than 100 kHz and the total output power of 14.5 dBm. The even/odd light sources were combined using a 50:50 polarization-maintaining optical couplers (OCPM) 28. The channel modulation comprises in-phase/quadrature-phase modulators (IQ Mod.) 30 and polarization multiplexers (P-MUX) 32. Each IQ Mod. 30 was driven by two sets of de-correlated pseudorandom bit sequence (PRBS) from PG 34 at 32 Gb/s with a word length of 211-1. After that, the line rate of each QPSK channels was doubled by using P-MUX 32. All the PM-QPSK channels at 128 Gb/s, under the assumption of both 24% SD-FEC and 4% protocol overheads, were aggressively shaped in spectrum domain and simultaneously combined via a 25-GHz wavelength-selective switch (WSS) 36. The aggregated channels were boosted by an Erbium doped fiber amplifier (EDFA) 38 giving a launch power of 1 dBm per channel. In the end, there were 8×128 Gb/s channels generated on a 25-GHz grid. This will be viewed as two independent 400G (512-Gb/s quad-carrier PM-QPSK) channels, as illustrated in the inset of FIG. 1, with no guard band in between, and each of which occupied 100-GHz spectral width.

The re-circulating loop indicated generally by the reference numeral 40 consists of 5 spans of 80-km SMF-28 42 with an average span loss of 17.5 dB and the chromatic dispersion coefficient of 17-ps/km/nm, loop control switch, and dual-stage C-band EDFAs It is note that there are no inline dispersion compensation modules. More importantly, in order to study the tolerance of the 512-Gb/s quad-carrier PM-QPSK signal against cascade narrowing filter effect along the transmission path, another WSS 44 was placed in the loop, which was programmed to be a 100-GHz add/drop filter. The two 512-Gb/s signals were fed into the common port of the WSS 44, and they were then filtered and routed to port 1 and port 2, respectively. Both signals were re-combined again by using a 50:50 OC 46 with one-aim 48 delayed for de-correlation.

Prior to the coherent receiver (Co. Rx) indicated generally by the reference numeral 50, a tunable optical bandpass filter (OBPF) 52 with 3-dB bandwidth of 0.4 nm was employed to choose the of-interest of PM-QPSK channel. The optical front-end of the Co. Rx 50 consisted of a fiber-laser local oscillator (LO) with a linewidth less than 100 kHz, a 90-degree hybrid for polarization and phase diversities, and four balanced photo-detectors. The output waveforms were captured using a real-time scope with an analog to digital converter (ADC) operated at 50 GSa/s, and a bandwidth of 18 GHz. For the digital signal processing (DSP), first, the clock was extracted by using "square and filter" method, and then the digitized signal was resampled at twice of the symbol rate based on the recovered clock. Second, a T/2-spaced time-domain finite impulse response (FIR) filter 54 was utilized for electronic dispersion compensation (EDC). Third, the polarization recovery and residual chromatic dispersion compensation by using classic constant modulus algorithm (CMA) was done with 23-tap, T/2-spaced adaptive FIR filters 56. Finally, carrier recovery including frequency offset estimation by fast Fourier transform method and carrier phase recovery by 4th power Viterbi-Viterbi algorithm were performed.

Figure 2:
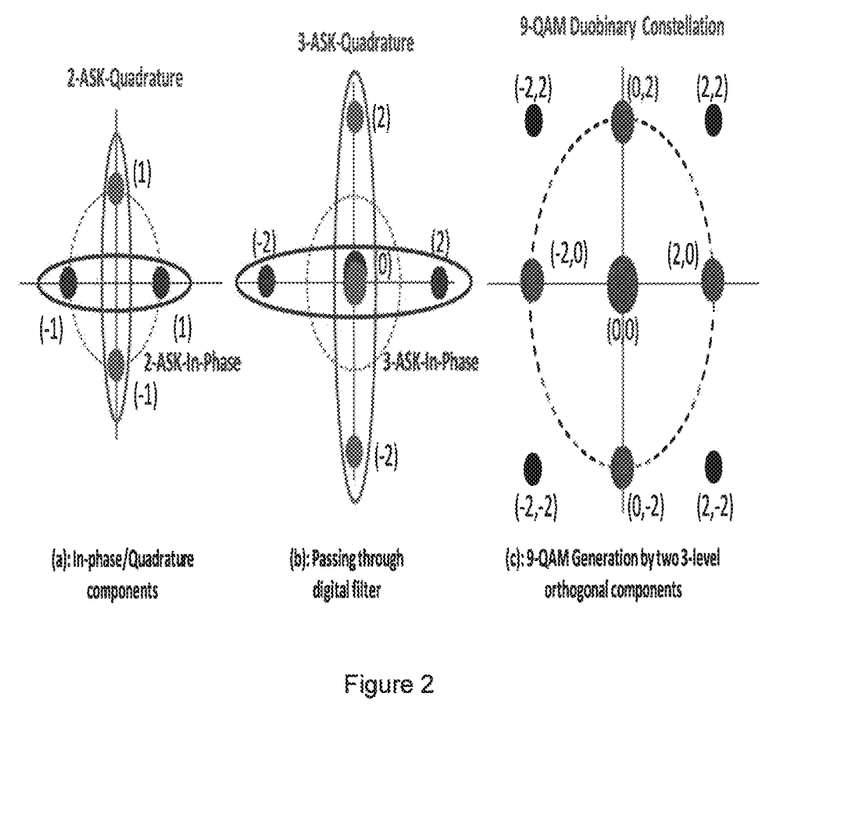
FIG. 2 is the illustration of 9-QAM signal generation by digital T-DAF.
Figure 3:
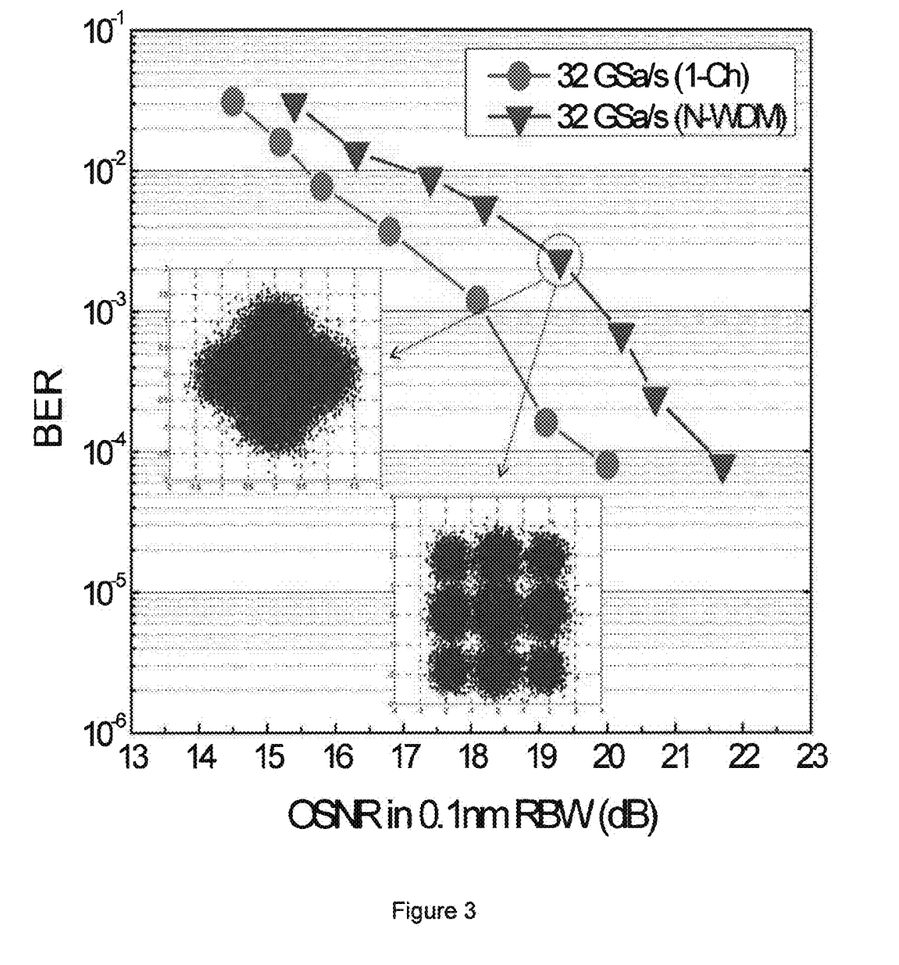
FIG. 3 is the illustration of Back-to-back BER Curves.
Figure 4:
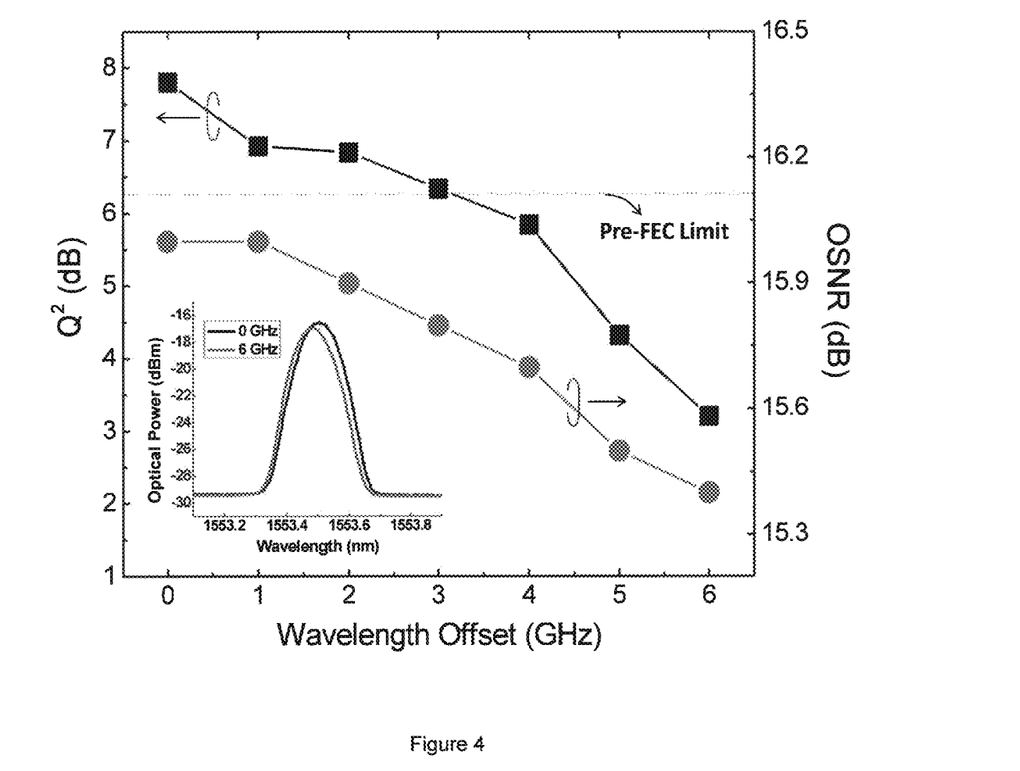
FIG. 4 illustrates the measured $Q^2$ factor and OSNR degradation as a function of wavelength offset.
Figure 5:
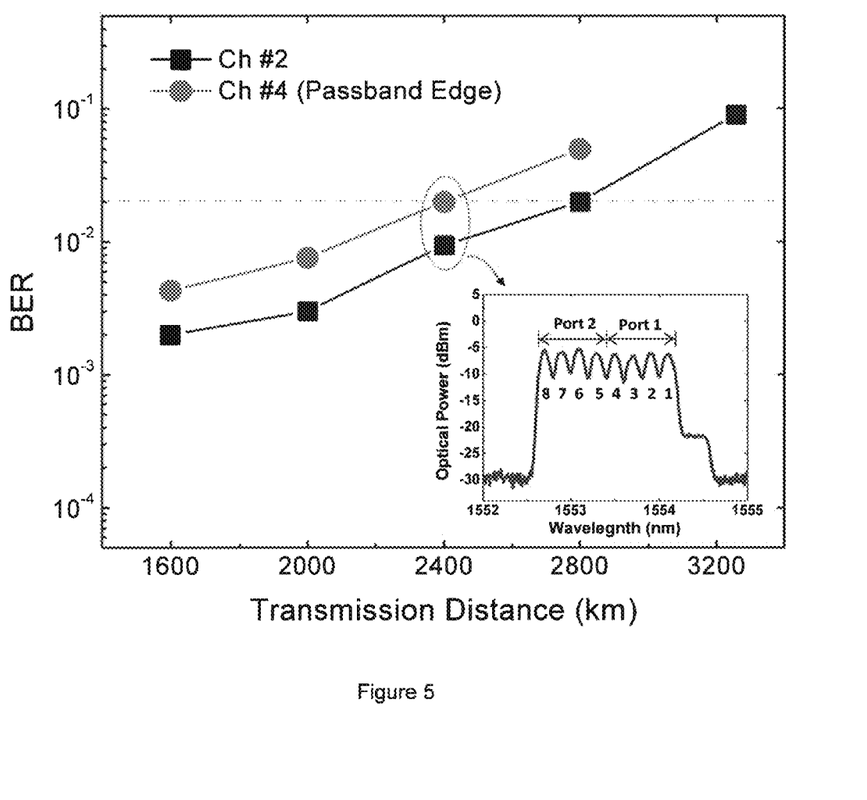
FIG. 5 illustrates the BER performance vs. transmission distance.

In addition to those typical algorithms for PM-QPSK demodulation, in this particular research work we additionally incorporated a linear T-spaced delay-and-add filter (T-DAF) 58 to the DSP flow after the carrier phase estimation stage to suppress the undesired noise and linear crosstalk enhancement caused by the use of linear equalizers in the presence of aggressive channel filtering 6. Such T-DAF 58 also made possible the employment of MLSE with a short memory length of only 1, further compensating transmission impairment. From the constellation point of view, the effect of this T-DAF digital filter 58 turns the originally recovered 4-point QPSK to 9-point quadrature duobinary signals. The evolution of this transformation is illustrated in FIG. 2. As a result of the delay-and-add effect, the 2-ASK in-phase and quadrature components disappear and independently change into two 3-ASK symbol series. The generation mechanism of 9-QAM signals can be considered as the superposition of two 3-ASK vectors on a complex plane, and the size of constellation points represents the relative number of points generated after the T-DAF digital filtering 58. FIG. 3 shows the BTB BER curves with and without adjacent channels at 32GBaud. At 2×10-2 BER, the required OSNR are 14.9 and 15.8 dB for single-channel and N-WDM cases, respectively. The insets show the received constellations of original QPSK and duobinary-shaped QPSK, respectively, at 19.2 dB OSNR in N-WDM case. Since in the proposed N-WDM transmission, the ratio of channel spacing to symbol rate is as low as 0.78, it is then important to know the impact of wavelength offset between each PM-QPSK channel and corresponding passband window of WSS on the system performance. FIG. 4 shows the Q2 factor and OSNR degradation as a result of the wavelength offset (minus offset show symmetry impact) in a BTB single-channel measurement. With wavelength offset less than 3 GHz, the Q2 factor drops by 0.5 dB/GHz in average, and it will deteriorate to 1.1 dB/GHz beyond 3 GHz. The inset shows the measured optical spectra of filtered PM-QPSK channel at 128 Gb/s with and without the wavelength offset. FIG. 5 shows the measured BER at multiple distance measuring points for different channels. Below 2×10-2 BER, Ch #2 can be delivered over 2800 km, while in the case of the Ch #4, the maximum distance was shortened by 400 km. This is because Ch #4 was located at the WSS passband edge, which inherently suffers from more bandwidth narrowing penalty. However, evidently 400G transmission using quad-carrier PM-QPSK approach can at least reach 2400 km on a 100-GHz grid with a net spectral efficiency of 4 b/s/Hz. The inset shows the received optical spectrum after 2400 km transmission with 20.4-dB delivered OSNR.

Figure 6:
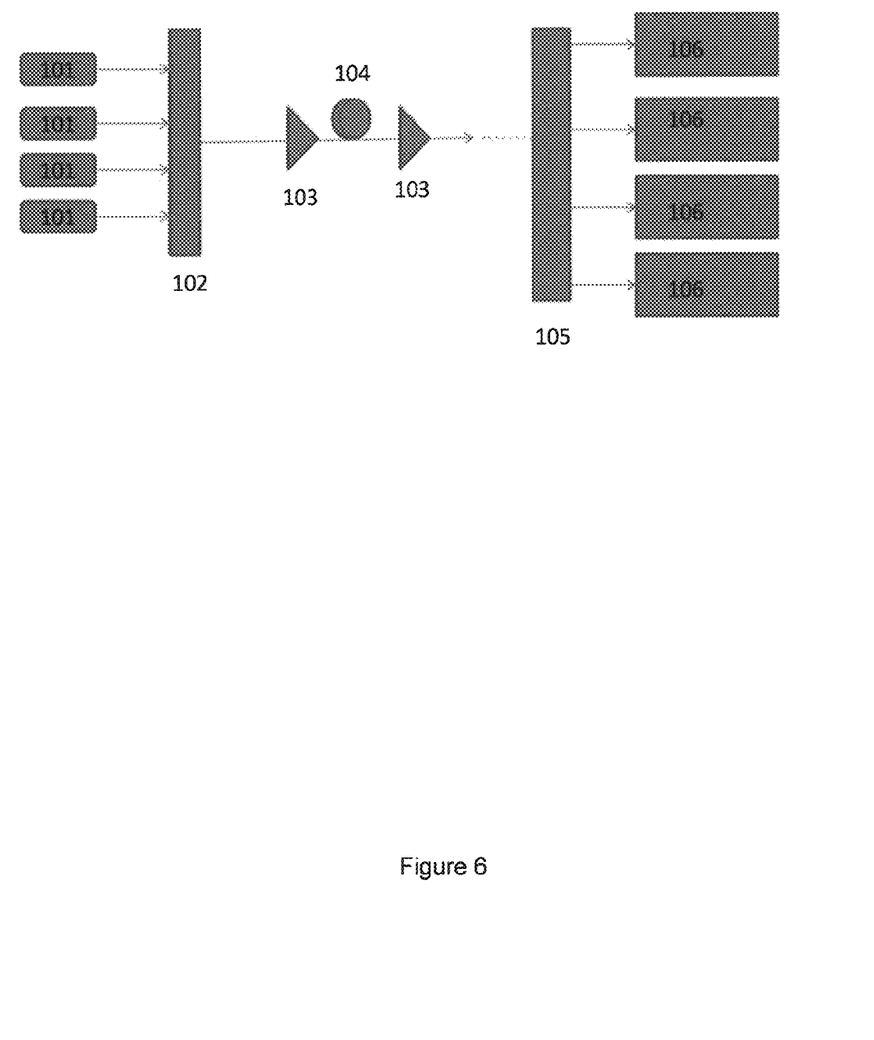
FIG. 6 illustrate the setup of the 400G transmitter and receiver.
Figure 7:
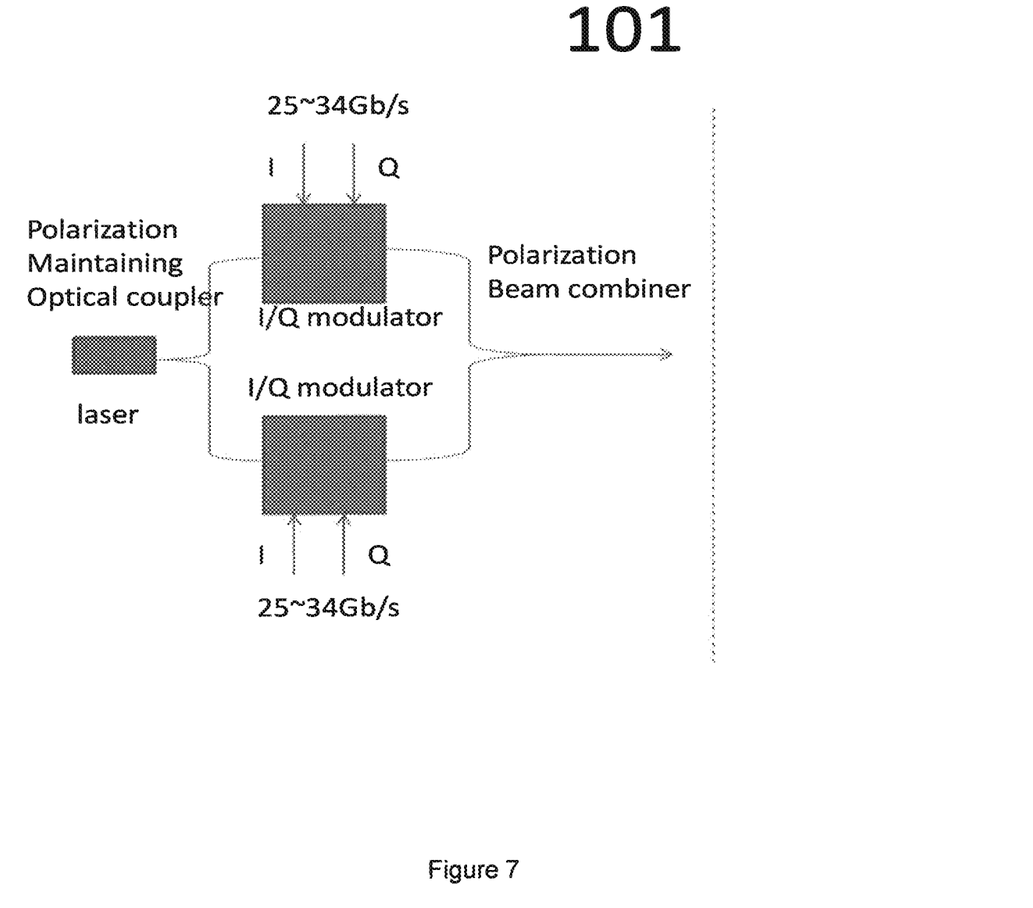
FIG. 7 illustrates component 101 of the setup of the 400G transmitter and receiver shown in FIG. 6.

Setup for the 400G transmitter and receiver are shown in FIG. 6 having components identified as 101, 102, 103, 104, 105, and 106. In more detail, the component 101 in FIG. 6 is illustrated in FIG. 7. More detailed discretions of the components are as follows:

For 101, as shown in FIG. 7, the laser can be any laser, such as distributed feedback laser diode, external cavity laser with linewidth smaller than 10 MHz. I/Q modulator is driven by I and Q electrical signal. The bit rate of I or Q can be 25~34 Gb/s binary on/off keying data. Polarization beam combiner is used to combine the two polarization signal. The neighboring laser spacing is 25 GHz so that it will occupy 100 GHz spacing for 400 Gb/s signal.

For 102, it can be spliced optical coupler, optical interleaver, arrayed waveguide grating or other optical coupler.

For 103, optical amplifier, it can be erbium doped fiber amplifier, Raman amplifier or other optical amplifier.

For 104, optical fiber, it can be standard single mode fiber or other special fiber.

For 105, optical filter, it be tunable optical filter, WDM coupler, arrayed waveguide grating or other optical filter. The system works even without any optical filter.

For 106, coherent detector, details on regular coherent detection with special digital signal process are provided in U.S. provisional application 61/581,946, filed Dec. 30, 2011, entitled DIGITAL FILTER, PARTIAL RESPONSE EQUALIZER, AND DIGITAL COHERENT RECEIVER DEVICE AND METHOD, incorporated hereinwith in its entirety.

CONCLUSIONS

A novel digital signal processing scheme (DSP) for quadrature duobinary (QDB) spectrum shaped polarization multiplexed quadrature phase shift keying (PM-QPSK) based on multi-modulus blind equalizations (MMBE) is demonstrated with both simulation and experimental results. The key algorithms for this novel digital signal processing scheme include the cascaded multi-modulus algorithm (CMMA) for blind polarization de-multiplexing, multi-modulus QPSK partitioning frequency offset estimation (FOE) and two stage carrier phase recovery (CPR) with maximum likelihood phase estimation. The final signal is detected by maximum-likelihood sequence detection (MLSD) for data BER measurement. The feasibility of the proposed digital signal processing scheme is demonstrated by the experiment of 112 Gb/s QDB spectrum shaped PM-QPSK signal with a 25 GHz bandwidth waveshaper for Nyquist WDM channels.

In another aspect, experimental demonstration is made for a long-reach 400G transmission using Nyquist quad-carrier PM-QPSK technique with a net spectral efficiency of 4 b/s/Hz. With T-spaced delay-and-add filter (T-DAF) and 1-bit MLSE added to the DSP flow at the coherent receiver, the enhanced noise and linear crosstalk can be effectively suppressed even at a low channel-spacing-to-symbol-rate ratio of 0.78. The results show that, even with bandwidth narrowing effect, 2400-km SMF-28 transmission of 512-Gb/s quad-carrier PM-QPSK signals with BER less than the SD pre-FEC limit of $2 \times 10^{-2}$ was realized.

It should be understood that the methods and devices of the present invention may be executed employing machines and apparatus including simple and complex computers. Moreover, the architecture and methods described above can be stored, in part or in full, on forms of machine-readable media. For example, the operations of the present invention could be stored on machine-readable media, such as magnetic disks or optical disks, which are accessible via a disk drive (or computer-readable medium drive). Alternatively, the logic to perform the operations as discussed above, could be implemented in additional computer and/or machine readable media, such as discrete hardware components as large-scale integrated circuits (LSI's), application-specific integrated circuits (ASIC's), firmware such as electrically erasable programmable read-only only memory (EEPROM's); and the like. Implementations of certain embodiments may further take the form of machine-implemented, including web-implemented, computer software.

While aspects of this invention have been shown and described, it will be apparent to those skilled in the art that many more modifications are possible without departing from the inventive concepts herein. The invention, therefore, is not to be restricted except in the spirit of the following claims.

ACKNOWLEDGEMENTS

This research study is supported by National High Technology Research and Development Program of China (No. 2012AA011303).

REFERENCES

[1] X. Zhou et al., Proc. ECOC'11, We.8.B.2, (2011).
[2] V. A. J. M. Sleiffer et al., Proc. OFC'12, OW4C.3, (2012).
[3] F. Buchali et al., Proc. OFC'12, OW4C.4, (2012).
[4] X. Liu et al., Proc. OFC'11, JThA37 (2011).
[5] P. J. Winzer et al., Proc. ECOCIO, PDP 2.2, (2010).
[6] J. Li et al., Proc. OFC'12, OM3H.2, (2012).

What is claimed is:

1. A method for transmitting a plurality of multicarrier optical signals, the method comprising:
    modulating respective polarization components of the plurality of multicarrier optical signals into modulated polarization components;
    combining the respective modulated polarization components of the plurality of optical signals into a plurality of modulated optical signals by T-spaced delay-and-add filtering (T-DAF) to convert a 4-point QPSK signal to 9-point quadrature duobinary signals to change the 2-ASK to 3-ASK vectors, and superimposing the 3-ASK vectors in a complex plane to thin' 9-QAM signals; and
    coupling the plurality of modulated optical signals into one combined modulated optical signal.

2. The method of claim 1, further comprising:
    amplifying, by an optical amplifier, the combined modulated optical signal.

3. The method of claim 2, further comprising:
    transmitting, over an optical fiber, the combined modulated optical signal.

4. A receiver front end for converting a received multicarrier partial response optical signal into a partial response digital signal;
    an equalizing device for equalizing a pre-filtered full response digital signal;
    a full response carrier recovery device for performing carrier recovery of the signal equalized by the equalizing device; and
    a post-filter for post-filtering the signal having undergone carrier recovery by the full response carrier recovery device;
    wherein the front end is operative to perform on the received optical signal blind polarization demultiplexing by a cascaded multi-modulus algorithm, multi-modulus QPSK partitioning frequency offset estimation, and two-stage carrier phase recovery with maximum likelihood phase estimation.

5. The receiver front end of claim 4 further comprising:
    a partial response data detection device for detecting the post-filtered signal.

6. The receiver front end of claim 5, wherein the partial response data detection device is a symbol-by-symbol detector.

7. The receiver front end of claim 5, wherein the partial response data detection device is a maximum-likelihood sequence detector.

8. A transmitter for transmitting a plurality of multicarrier optical signals, the transmitter comprising:
    modulators configured to modulate respective polarization components of the plurality of multicarrier optical signals into modulated polarization components;
    combiners configured to combine the respective modulated polarization components of the plurality of optical signals into a plurality of modulated optical signals by T-spaced delay-and-add filtering (T-DAF) to convert a 4-point QPSK signal to 9-point quadrature duobinary signals to change the 2-ASK to 3-ASK vectors, and superimposing the 3-ASK vectors in a complex plane to form 9-QAM signals; and
    at least one optical coupler configured to couple the plurality of modulated optical signals into one combined modulated optical signal.

9. The transmitter of claim 8, further comprising:
    an optical amplifier configured to amplify the combined modulated optical signal.

10. A method for receiving multicarrier signals in an optical communication system, comprising converting a received partial response optical signal into a partial response digital signal, wherein the converting comprises:
    equalizing a pre-filtered full response digital signal by performing multi-modulus blind equalization;
    performing carrier recovery of the equalized signal by FFT and 4th power Viterbi-Viterbi algorithm;

post-filtering the signal having undergone carrier recovery; and blind polarization demultiplexing by a cascaded multi-modulus algorithm, multi-modulus QPSK partitioning frequency offset estimation, and two-stage carrier phase recovery with maximum likelihood phase estimation.

11. The method of claim 10 further comprising:
detecting the post-filtered signal.

12. The method of claim 11, wherein the detecting comprises symbol-by-symbol detecting.

13. The method of claim 11, wherein the detecting comprises maximum-likelihood sequence detecting.

14. An article of manufacture including a computer-readable medium having instructions stored thereon, comprising:
  instructions for causing at least one modulator to modulate respective polarization components of the plurality of multicarrier optical signals into modulated polarization components;
  instructions for causing at least one combiner to combine the respective modulated polarization components of the plurality of multicarrier optical signals into a plurality of modulated optical signals by T-spaced delay-and-add filtering (T-DAF) to convert a 4-point QPSK signal to 9-point quadrature duobinary signals to change the 2-ASK to 3-ASK vectors, and superimposing the 3-ASK vectors in a complex plane to form 9-QAM signals; and
  instructions for causing at least one optical coupler to couple the plurality of modulated optical signals into one combined modulated optical signal.

15. The article of manufacture of claim 14, further comprising:
  instructions for causing an optical amplifier to amplify the combined modulated optical signal.

16. The article of manufacture of claim 15, further comprising:
  instructions for causing the combined modulated optical signal to be transmitted over an optical fiber.

17. An article of manufacture including a computer-readable medium having instructions stored thereon, comprising instructions for converting a received partial response multicarrier optical signal into a partial response digital signal, said instructions for converting comprising:
  instructions for multi-modulus blind equalization of a pre-filtered full response digital signal;
  instructions for performing carrier recovery of the equalized signal by FFT and 4th power Viterbi-Viterbi algorithm;
  instructions for post-filtering the signal having undergone carrier recovery; and
  instructions for blind polarization demultiplexing by a cascaded multi-modulus algorithm, multi-modulus QPSK partitioning frequency offset estimation, and two-stage carrier phase recovery with maximum likelihood phase estimation.

18. The article of manufacture of claim 17 further comprising:
  instructions for detecting the post-filtered signal.

19. The article of manufacture of claim 18 wherein the detecting comprises symbol-by-symbol detecting.

20. The article of manufacture of claim 18 wherein the detecting comprises maximum-likelihood sequence detecting.

21. The method of claim 1, wherein the optical signals having a bit rate selected from the group of 512 Gb/s and 400 Gb/s.

22. The receiver front end of claim 4, wherein the optical signals having a bit rate selected from the group of 512 Gb/s and 400 Gb/s.

23. The transmitter of claim 8, wherein the optical signals having a bit rate selected from the group of 512 Gb/s and 400 Gb/s.

24. The method of claim 10, wherein the optical signals having a bit rate selected from the group of 512 Gb/s and 400 Gb/s.

25. The article of manufacture of claim 14, wherein the instructions are operable upon optical signals having a bit rate selected from the group of 512 Gb/s and 400 Gb/s.

26. The article of manufacturing of claim 17, wherein the instructions are operable upon optical signals having a bit rate selected from the group of 512 Gb/s and 400 Gb/s.

* * * * *